UNITED STATES PATENT OFFICE.

WILLIAM G. LINDSAY, OF CALDWELL, NEW JERSEY.

PROCESS OF MAKING ACETYL-CELLULOSE PLASTICS AND SOLVENTS.

1,244,348. Specification of Letters Patent. Patented Oct. 23, 1917.

No Drawing. Original application filed November 6, 1911, Serial No. 658,783. Renewed March 19, 1917, Serial No. 155,951. Divided and this application filed March 19, 1917. Serial No. 155,933.

*To all whom it may concern:*

Be it known that I, WILLIAM G. LINDSAY, a citizen of the United States, residing in Caldwell, county of Essex, State of New Jersey, have invented a certain new and useful Process of Making Acetyl-Cellulose Plastics and Solvents, of which the following is a specification, being a division from my copending application Ser. 658,783, filed Nov. 6, 1911, renewed under Serial No. 155,951, filed March 19, 1917.

The various compositions to which the present invention relates are employed in the arts, generally as imitations of natural substances, sometimes in their original finished form with or without incorporated colors, and sometimes as films which are used for photographic and other purposes.

Although the final or useful form of the different compounds of acetyl cellulose is that of a solid or dried material, the different processes of conversion into this final solid form involve, as is well understood, the employment of solutions or mixtures of varying consistency as to plasticity, stiffness, or fluidity, depending generally upon the proportion and kind of solvent used to the amount of the original base—acetyl cellulose.

It has long been known that camphor mixed with nitro cellulose upon the addition of ethyl alcohol to the mixture becomes a solvent of the nitro cellulose. I have found, however, that when that process is applied to acetyl cellulose no solvent action takes place in the cold, and the object of my invention was to find substances which, when added to the acetyl cellulose would, upon the subsequent addition of ethyl alcohol, exert a solvent action upon the cellulose and produce a plastic mass which could be worked in a manner analogous to nitro cellulose—camphor compounds.

I have discovered that not all of the so-called camphor substitutes possess this property when used with acetyl cellulose, and in the course of my experiments I have found that camphor substitutes may be grouped into three classes with respect to their solvent action on acetyl cellulose, namely:—

Class A: Those substances which are non-solvents when melted, or when dissolved in either ethyl or methyl alcohol in the cold, or room temperature, such as triphenylphosphate, tricresylphosphate, and naphthalene.

Class B: Those substances which become solvents when melted, but are non-solvents when dissolved in ethyl alcohol at room temperature; such as camphor, tetrachlorethyl acetanilid, and trichlormethyl acetanilid.

Class C: Such substances as become solvents when melted and also become solvents when dissolved in methyl or ethyl alcohol in equal parts by weight at room temperature; such as toluol-sulfonamid, ethyl para toluolsulfonamid, benzene-sulfonamid, ethyl acetanilid, and methyl-acetanilid.

I have also discovered that in making flowable solutions from my new compounds, I can employ substances other than those mentioned, and I have accordingly divided my main application into four divisions, each forming the subject of a separate application and designated by the letters A (Ser. No. 658,783), B (Ser. No. 658,784), C (Ser. No. 658,785), and D (Ser. No. 658,786), respectively, all filed on November 6, 1911.

In order to carry out the new process which forms the subject matter of this application (Division A), as one example, I incorporate 100 parts of an acetyl cellulose which is soluble in acetone with 20 to 50 parts of ethyl para toluol-sulfonamid by suitable grinding and mixing, as is the practice in the nitro cellulose art. To such mixture I add from 40 to 100 parts of ethyl or of methyl alcohol, or a mixture of the two, and after thorough incorporation by stirring, the mixture is allowed to remain at room temperature in a closed vessel for from 5 to 24 hours, or longer, the length of time depending upon the physical form of the acetyl cellulose used; that is, whether it is finely or coarsely ground. In the course of time the mixture will have become converted into a more or less stiff gelatinated mass. It can then be worked up on rolls or a kneading machine, according to the practice which is common in the nitro cellulose-camphor plastic art, and the resulting product may then be molded or passed through the stuffing machine as in the case of nitro cellulose-camphor compounds.

I have found that a mixture composed of 1 part by weight each of ethyl alcohol and ethyl para toluol-sulfonamid is a more powerful solvent than a mixture of 2 parts by weight of ethyl alcohol and 1 part by weight of ethyl para toluol-sulfonamid. If the alcohol is increased beyond this proportion the solvent power rapidly decreases; hence it is desirable to use as small a proportion of alcohol as possible in converting the acetyl cellulose into a gelatinous mass, but the application of heat will restore to a certain extent the solvent action of a solvent mixture which is otherwise too weak. A proportion of 1.5 parts of ethyl or methyl alcohol to 1 part of ethyl para toluol-sulfonamid also produces very satisfactory results as a gelatinating agent for acetyl cellulose.

Instead of the ethyl para toluol-sulfonamid I can use benzene-sulfonamid, and also ethyl acetanilid and related derivatives.

In order to produce flowable solutions in the cold from the gelatinous mass made according to the process above described and solutions which are suitable for filtering, etc., I have found that suitable solvents or diluents for such purposes are produced by incorporating with the mass, mixtures of either ethyl or methyl alcohol with the following liquids in the proportions hereinafter described. These liquids are chloroform, epichlorhydrin, acetodichlorhydrin, dichlor-ethylene, ethylene-chlorid, trichlorhydrin, pentachlorethane, acetochlorhydrin, acetylenetetrachlorid, chloracetate of ethyl, acetone, ethylacetate, and di-acetochlorhydrin.

A mixture produced by combining one of the above liquids with an equal volume of methyl or of ethyl alcohol, or a mixture of the two, will produce a solvent for acetyl cellulose of the acetone soluble variety.

I have discovered, also, that when the proportion of methyl or ethyl alcohol is increased beyond the proportion to produce a solvent mixture, the addition of a camphor substitute of Class C reëstablishes the solvent action.

In order to convert the gelatinous mass produced according to the process above described into a more fluid mixture which can be filtered, etc., I use a mixture of methyl or ethyl alcohol containing from 20% to 40% by volume of any of the above liquid substances. To 1 part of the gelatinous mass I add from 1 to 4 parts of the compound solvent, or sufficient to produce a product of the desired fluidity, and incorporate it by mixing, kneading, stirring, or malaxating. After filtration or other treatment, the solution of acetyl cellulose thus produced is worked up in the usual manner by evaporating the excess of solvent and further kneading, pressing, etc., the resultant mass. Here, again, I have found that if the solvent is too weak, the application of heat will restore the solvent action.

If it is desired to produce a non-inflammable acetyl cellulose plastic compound which is made according to the process above described, I have found that this can be done by incorporating with the product of that process such camphor substitutes of Class A above set forth as triphenylphosphate which effect non-inflammability in the resultant mass. That is, the inflammability of the plastic masses made by the use of camphor substitutes of Class C can be reduced and overcome by incorporating such camphor substitutes as triphenylphosphate which belong to Class A. I have found that this can be accomplished by proceeding as follows:

I incorporate with 100 parts of acetyl cellulose, 20 parts of ethyl para toluol-sulfonamid and 20 parts of triphenylphosphate, and after thorough grinding, mixing, etc., I add 40 to 60 parts of methyl or ethyl alcohol, but I prefer methyl alcohol. The gelatinous mass produced by allowing the mixture to stand at room temperature in an air tight receptacle is further worked up by kneading, etc., according to practices well known to the nitro cellulose art. If it is desired to produce a more fluid solution, the addition of 1 to 4 parts of a mixture consisting of 70 parts volume of ethyl or methyl alcohol and 30 parts by volume of dichlorethylene, ethylenechlorid or chloroform, is added. It will thus be seen that the question of proportions enters very largely into the successful practice of the processes and the compositions of the new solvents described in this specification.

The generic expression "alkyl aryl acetamid" in the claims comprises such equivalent substances for the purposes of this invention as methyl and ethyl acetanilid.

By ethylpara or paraethyltoluolsulfonamid, I means the compound having the following structural formula:

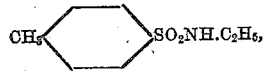

the same being an alkylated aromatic sulfonamid.

I disclaim in the present application the process covered by my prior Patent, No. 1,041,113, granted October 15, 1912, wherein triphenyl phosphate or tricresyl phosphate is used.

What I claim is:

1. The process of making acetyl cellulose plastic masses which comprises incorporating an acetone-soluble acetyl cellulose with an alkyl aryl acetamid in the presence of a small proportion of a monohydric alcohol having not more than two carbon atoms.

2. The process of making acetyl cellulose plastic masses which comprises incorporating an acetone-soluble acetyl cellulose with an alkyl acetanilid in the presence of a small porportion of a monohydric alcohol having not more than two carbon atoms.

3. The process of making acetyl cellulose plastic masses which comprises incorporating an acetone-soluble acetyl cellulose with an alkyl acetanilid having not more than two carbon atoms in the alkyl group.

4. The process of making acetyl cellulose plastic masses which comprises incorporating about 100 parts of an acetone-soluble acetyl cellulose with about 20 to 50 parts of an alkyl aryl acetamid and about 40 to 100 parts of a monohydric alcohol having not more than two carbon atoms.

5. The process of making acetyl cellulose plastic masses which comprises incorporating about 100 parts of an acetone-soluble acetyl cellulose with about 20 to 50 parts of an alkyl acetanilid and about 40 to 100 parts of a monohydric alcohol having not more than two carbon atoms.

6. The process of making acetyl cellulose plastic masses which comprises incorporating about 100 parts of an acetone-soluble acetyl cellulose with about 20 to 50 parts of an alkyl acetanilid having not more than two carbon atoms in the alkyl group.

WILLIAM G. LINDSAY.